United States Patent [19]

Leviton

[11] Patent Number: 5,058,281
[45] Date of Patent: Oct. 22, 1991

[54] CONTROL SYSTEM FOR RULING BLAZED, ABERRATION CORRECTED DIFFRACTION GRATINGS

[75] Inventor: Douglas B. Leviton, Dunkirk, Md.

[73] Assignee: The United States of America as represented by the Administrator of the National Aeronautics & Space Administration, Washington, D.C.

[21] Appl. No.: 571,344

[22] Filed: Aug. 23, 1990

[51] Int. Cl.$^5$ .............................................. B43L 13/24
[52] U.S. Cl. ..................................... 33/19.2; 33/23.02
[58] Field of Search .................... 33/19.2, 19.1, 23.01, 33/23.02, 23.03

[56] References Cited

U.S. PATENT DOCUMENTS

| | | |
|---|---|---|
| 2,527,338 | 10/1950 | Stamm . |
| 3,344,526 | 10/1967 | Horsfield . |
| 4,219,933 | 1/1980 | Kita et al. . |
| 4,690,506 | 1/1987 | Kita et al. . |

OTHER PUBLICATIONS

Scientific American, Aug. 1985, "The Scanning Tunneling Microscope", G. Binnig et al., pp. 50–56.
J. Vac. Sci. Technology, May/Jun. 1986, "A Simplified Scanning Tunneling Microscope for Surface Science Studies", J. Demuth et al., pp. 1320–1323.
SPIE, vol. 815, 1987, "Observation of Grating Surfaces by the use of STM", T. Oshio et al., pp. 124–126.

Primary Examiner—Harry N. Haroian
Attorney, Agent, or Firm—R. Dennis Marchant; Harold W. Adams; Alan J. Kennedy

[57] ABSTRACT

The grooved surface of an aberration-corrected holographic model grating is sensed by utilizing the sensing head of a scanning tunneling microscope. The sensing head is mechanically connected to a blazing type stylus for replicating the groove pattern of the holographic model on a ruled grating blank. A ruling engine causes the sensing head not only to scan the surface of the holographic grating model but also drive a blazing type ruling stylus or an equivalent type device in accordance with an error signal resulting from a departure of a sensing tip from the top of the holographic model groove as a function of tunneling current.

20 Claims, 2 Drawing Sheets

CONTROL SYSTEM FOR RULING BLAZED, ABERRATION CORRECTED DIFFRACTION GRATINGS

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention relates generally to a system for ruling diffraction gratings whose groove spaces replicate the gratings of a model diffraction grating, and more particularly to a system for ruling a grating blank with blazed grooves so as to have the properties of a holographic grating by using an aberration corrected holographic grating as a model.

The fabrication of diffraction gratings has heretofore utilized either of two techniques; namely, mechanical ruling and holographic recording. Each had its own particular advantages and disadvantages. Mechanical ruled gratings are typically fabricated by driving a diamond stylus across a coating of metal or other material formed on a polished substrate and thereby burnishing a groove in the surface. This process is carried out with great precision in a step and repeat process with the result being a grating having generally straight, parallel and evenly spaced grooves.

Holographic gratings, on the other hand, are fabricated by coating a polished substrate with photoresist material and thereafter exposing the photoresist to an optical fringe pattern produced by the interference of two coherent light beams and which is thereafter followed by developing the exposed photoresist material. The result achieved in holographic grating is a corrugated surface corresponding to the fringe pattern to which the substrate was exposed.

The advantage of mechanical ruling is primarily in the ability to control the groove shape through the selection of the geometry of the ruling stylus and other ruling parameters because groove shape strongly affects the diffracted efficiency from the grating. The disadvantages of a mechanically ruled grating stems from the mechanical nature of the process itself. As the step and repeat process is carried out, random and periodic errors in the mechanical system act to perturb the groove-to-groove phase accuracy. The resulting undesirable effects of imperfect phase accuracy across the grating produce ghost images of the diffracted orders in the plane of dispersion and scattered light between orders in this plane. Both of these effects thus limit the usefulness of ruled gratings in modern relatively high sensitive, high resolution spectrographs. Holographically generated gratings, on the other hand, provide an advantage in that all the grooves are in perfect registration with each other because of the ideal behavior of the interfering light beams. All the grooves, moreover, are recorded simultaneously, which eliminates problems associated with mechanical errors. The resulting effects are the elimination of ghosts and very low scattered light in the plane of dispersion.

It should be noted that the groove shape of a properly blazed grating is triangular in vertical cross section and resembles a sawtooth, while the groove shape of holographic gratings is somewhat rounded and thus is approximately sinusoidal, hereinafter referred to simply as sinusoidal. The triangular groove is desirable in one respect in that it yields a relatively high diffracted efficiency into the desired order. The sinusoidal groove of the holographic gratings, on the other hand, exhibit an undesirable characteristic in that it leads to significantly lower diffracted efficiency into a desired order.

Accordingly, it is an object of the present invention to provide an improvement in the fabrication of ruled diffraction gratings.

It is another object of the invention to fabricate a ruled diffraction grating having the properties of a holographic grating.

It is still another object of the invention to produce a ruled blazed diffraction grating having the properties of an aberration corrected holographic grating.

SUMMARY

Briefly, the foregoing and other objects of the invention are realized by the method and apparatus of sensing the grooved surface of an aberration-corrected holographic model grating utilizing a sensing head of a scanning tunneling microscope. The sensing head is mechanically connected to a blazing type stylus for replicating the groove pattern of the holographic model on a ruled grating blank. A ruling engine causes the sensing head not only to scan the surface of the holographic grating model but also drive a blazing type ruling stylus or an equivalent in accordance with an error signal resulting from a departure of a sensing tip from the top of the holographic model groove as a function of tunneling current.

BRIEF DESCRIPTION OF THE DRAWING

The following detailed description will be more readily understood when considered together with the following drawing wherein.

DETAILED DESCRIPTION OF THE INVENTION

Figure 1:
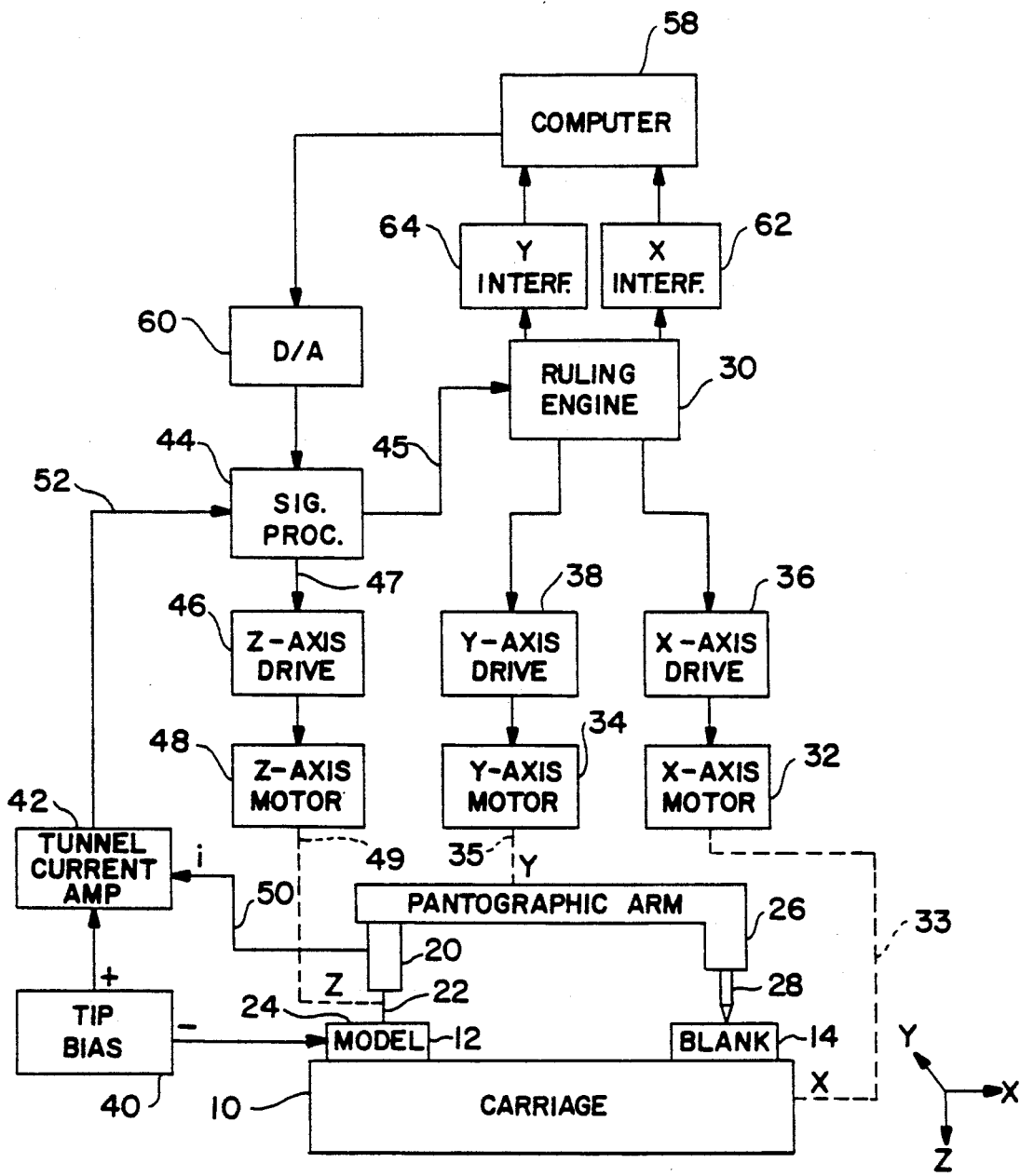
FIG. 1 is an electrical block diagram of the preferred embodiment of the invention.
Figure 2:
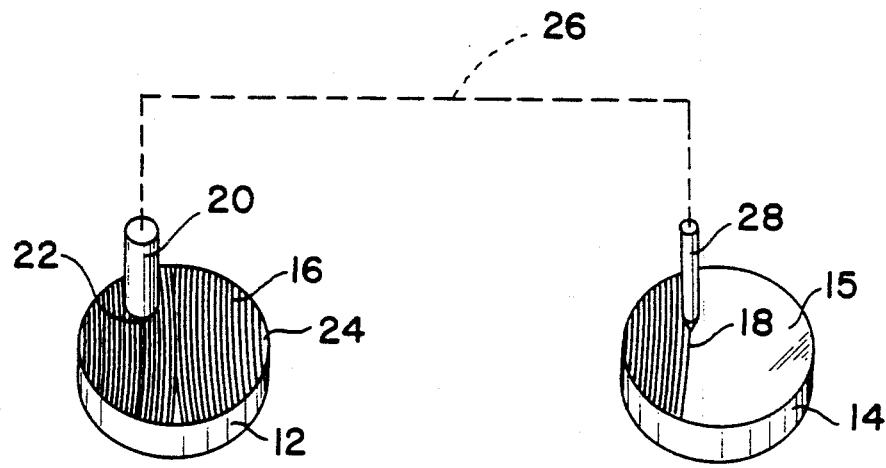
FIG. 2 is a mechanical schematic diagram illustrative of the operation of the embodiment shown in FIG. 1.

Referring now to the figures and more particularly to FIGS. 1 and 2, reference numeral 10 denotes a common support or carriage for both a model holographic grating 12 and a grating blank 14 which is to be ruled in accordance with the grooves 16 holographically formed in the model grating 12 as shown in FIG. 2. The grooves 16, moreover, are intended to illustrate that they are non linear and therefore aberration corrected as opposed to straight, parallel, evenly spaced grooves which are unable to correct certain types of optical aberrations introduced by certain elements in optical spectrograph designs.

Commercially available aberration corrected holographic gratings, moreover, have only recently become available. It has been noted that whereas holographic gratings consist of grooves which have a sinusoidal cross section, it becomes desirable to replicate the same groove pattern on a ruled grating surface having a triangular or sawtooth cross section to thereby yield an improvement in diffraction efficiency. Accordingly, it is the purpose of the present invention to trace the holographic grating's grooves 16 on the model 12 and produce a replicated grating with blazed grooves on the blank 14. This is accomplished by the apparatus as shown in block diagrammatic form in FIG. 1.

The apparatus shown in FIG. 1 uses a tracing sensor 20 comprising the head of a scanning tunneling microscope (STM) and including an extremely fine tip 22 which is positioned within a few nonometers of the surface 24 to obtain a quantum mechanical tunneling current between the tip 22 and the sample surface 24. The principles of a scanning tunneling microscope (STM) are generally well known, having recently been invented by Gerd Binnig and Heinrich Rohrer. Such apparatus is shown and described, for example, in a publication entitled, "The Scanning Tunneling Microscope", G. Binnig et al, which appeared in the Scientific American, August, 1985, at pp. 50–56. The use of an STM to examine the surface of an optical grating is also known, having been disclosed, for example, in a publication entitled "Observation of Grating Surfaces By the Use of STM", T. Oshio et al in SPIE, Vol. 815, "Application and Theory of Periodic Structures, Diffraction Gratings and Moire Phenomena III", 1987, at pp. 124–126.

Further as shown in FIG. 1, the scanning head 20 is secured to a rigid pantographic type arm member 26 to which is attached a burnishing type ruling stylus 28. The support or carriage 10 comprises a member which is moved in the X axis direction of three mutually perpendicular axes by means of a ruling engine 30 which controls an X axis drive motor 32 connected to the carriage 10 by means of a mechanical connection 33 in accordance with electrical signals coupled to an X drive circuit 36. The ruling engine 30 also moves the pantographic arm member 26 in the Y axis direction by means of a Y axis motor 34 mechanically connected to the arm 26 by means 35. The drive motor 34 is supplied signals from a Y axis drive circuit 38 coupled to the ruling engine 30.

The Y axis direction constitutes both the scanning direction of the tip 22 and the ruling direction of the stylus 28 across the respective grating elements 12 and 14. The X axis is used to affect curvature of the grooves 18 being replicated once the stylus has been set in place on the surface 15 of the blank 14 (FIG. 2).

While X axis movement is shown in FIG. 1 as being accomplished via the carriage 10, it should be noted that when desirable X axis motion ca be achieved by coupling the X axis motor 32 to the pantograph 26, with the carriage 10 being held stationary.

Z axis motion is imparted to the tip 22 via a servo control loop involving the tunneling current which is established by applying a bias between the tip 22 and the surface 24 of the holographic model 12. This is provided by applying a relatively small negative DC bias to the model grating 12 from a source 40.

Tunneling current i is sensed in the head 20 and is used in a feedback circuit including a tunnel current amplifier 42, an analog signal processor 44, a Z axis drive circuit 46 coupled to the signal processor 44 via circuit lead 47 and a Z axis motor 48 which is mechanically coupled to the tip 22 by means of a mechanical connection 49. This arrangement operates to maintain the tunneling current i constant and the tip 22 at a constant height above the conducting surface 24 of the grating 12. As shown, the tunneling current i is coupled to the tunnel current amplifier 42 via signal lead 50 which generates an amplified signal that is coupled to the analog signal processor 44 by means of a circuit lead 52.

The analog signal processor 44 additionally receives an analog input signal from a digital signal processor shown as a computer 58 via a digital to analog converter 60. The computer in turn receives inputs from X and Y axis interferometers 62 and 64 coupled to or made part of the ruling engine 30.

The analog signal processor 44 generates two signals, one of which comprises a Z axis error signal comprising the difference between a set or desired value of tunnel current corresponding to a desired height of the tip 22 above the model surface 24 and the actual current. The error signal is coupled to the Z axis drive circuit 46 which operates the Z axis motor 48 to position the tip 22 until a zero error signal results.

In a like manner, the analog signal processor 44 also generates an output signal which is coupled to the ruling engine 30 via circuit lead 45 to drive the X axis motor 32 coupled to the carriage 10 to blaze a replicated groove 18 in the blank 14 by motion of the stylus 28 in the X axis direction. Accordingly, the signals on circuit lead 52 generate spatial information regarding the grooves 16 being scanned in the Y direction on the model grating. This information is transferred to the stylus 28 by the ruling engine 30 controlling the X axis motion of the carriage 10 beneath the pantograph arm 26.

Thus the transverse motion of the carriage 10 along the X axis is simultaneously controlled along with the motion of the tip along the Z axis such that the derivative of the tunneling current with respect to motion in the ruling direction (di/dy), i.e. along the Y axis, is maintained at a null to assure that the tip traces the top of the model groove 16. The derivative (dx/dy) of motion in the transverse direction X with respect to the motion in the ruling direction Y is also taken into account for assuring that the system is immune to defects encountered in the grooves 16 in the model grating 12.

The analog signal processor 44 operates to generate control signals which maintain the STM tip 22 above the top of the grooves 16 on the model grating 12 by correcting the Z-axis tip-to-model separation of the X-axis transverse carriage motion, taking into account the expected curvature of the groove currently being ruled. These control signals are used for X and Z corrections to help the replication process be immune to defects encountered in the grooves 16 of the model grating 12 and to prevent the STM tip from wandering arbitrarily over the surface of the model grating. The contribution of the curvature dominates only when the Z and X correction signals become suddenly unreasonable or erratic as when the STM tip 22 encounters a defect in the particular groove 16 being sensed. In such a situation, the time rates of change of the X and Z signals (dX/dt and dZ/dt) would be abnormally large and would likely have unusually large spectral densities at higher frequencies. Also, the Z signal would be maintained relatively independently of the curvature signal while the X signal would depend strongly on the curvature signal.

The analog signal processor 44 receives inputs of the amplified tunneling current signal and the analog signal generated by the digital to analog converter 60 via the computer 58. The computer 58 accordingly generates a signal corresponding to the instantaneous deviation from a straight line for a groove currently being sensed and ruled. This signal is generated as follows: The computer reads the X interferometer 62 signal from the ruling engine 30 at the start of ruling of a new groove 18. From that signal, it determines the stores the X starting coordinates x0 for that groove. As the groove 18 is being ruled, the computer 58 reads the Y interferometer 64 signal from the ruling engine and calculates the instantaneous direction for the groove, dx(x0, y)/dy, relative to a straight line groove for which dx(x0,y)/dy=0. The term dx(x0,y)/dy expresses the slope in X,Y coordinate space for a groove, calculable for the model grating as a function of the groove's starting point x0 for y=0 and the instantaneous value of y. The numeric deviation controls the digital to analog converter to send a proportionate signal to the analog signal processor 44. When the ruling of a groove is completed, the engine 30 is reset to the beginning of the next groove (y=0) using the X interferometer 62 signal in conjunction with the previously stored value of x0.

Figure 3:
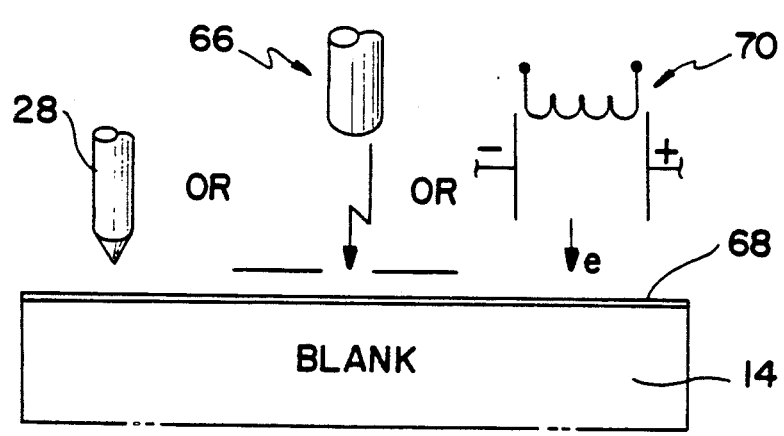
FIG. 3 is a diagram illustrative of alternative means for ruling the grating blank shown in FIG. 1.

Although the blazing stylus 28 shown in FIGS. 1 and 2 is the desirable means for fabricating the blazed grating, it can be replaced, when desired, by apparatus 66 as shown by FIG. 3 which generates a focused beam of light onto a photosensitive resist or emulsion layer 68 formed on the blank 14. Another alternative for forming the grooves 18 could be means 70 for generating a focused electron beam.

Accordingly, what has been shown and described is the utilization of scanning tunneling microscope technology for sensing, in a mechanical replication process, holographically generated diffraction gratings. This in effect integrates both holographic recording and mechanical ruling technologies for producing highly efficient, low scatter, aberration corrected diffraction gratings. When desirable, this technique can also be used to generate photolithographic masks.

Having thus shown and described what is at present considered to be the preferred embodiment and method for practicing the invention, it should be noted that the same has been made by way of illustration and not limitation. Accordingly, all modifications, alterations and changes coming within the spirit and scope of the invention as defined in the following claims are herein meant to be included.

I claim:

1. A method of ruling a diffraction grating, comprising the steps of:
   locating means for forming diffraction grating grooves on a diffraction grating blank adjacent the surface of said blank;
   scanning the surface of a holographic model diffraction grating;
   sensing the grooved surface of the holographic model diffraction grating,
   generating electrical signals representative of the spatial characteristics of the grooved surface during the sensing step;
   controlling said means for forming grooves in response to said electrical signals; and
   replicating the grooves of the model grating in the surface of the diffraction grating blank.

2. The method as defined by claim 1 wherein said step of sensing comprises the step of sensing the spatial characteristics of the grooves of the holographic model diffraction grating with a sensing head of a scanning tunneling microscope.

3. The method as defined by claim 2 wherein said step of sensing includes applying a bias voltage between the model grating and the sensing head and sensing quantum mechanical tunneling current to obtain a surface profile of individual grooves of the model grating.

4. The method as defined by claim 3 wherein said sensing step comprises sensing the grooved surface of an aberration corrected holographic grating model.

5. The method as defined by claim 3 and additionally including the step of securing the model diffraction grating and the diffraction grating blank on a common carriage.

6. The method as defined by claim 5 and additionally including the step of physically linking said sensing head and said means for forming grooves.

7. The method as defined by claim 6 wherein said step of scanning comprises scanning the surface of the model grating with a ruling engine.

8. The method as defined by claim 7 wherein said step of scanning with a ruling engine comprises driving said carriage along two of three mutually perpendicular axes and wherein said step of sensing quantum mechanical tunneling current comprises sensing said current along a third of said three mutually perpendicular axes.

9. The method as defined by claim 8 wherein said replicating step comprises blazing grooves in the surface of the grating blank.

10. The method as defined by claim 8 wherein said replicating step comprises ruling the surface of the grating blank with a blazing type stylus.

11. Apparatus for ruling a diffraction grating, comprising:
    a model diffraction grating including a pattern of holographic grating grooves on a surface thereof;
    a diffraction grating blank having a surface which is to be ruled with diffraction grating grooves;
    means for sensing the grooved surface of the holographic model diffraction grating and generating electrical signals representative of the spatial characteristics of the grooved surface thereof;
    means for replicating the grooves of the model grating in the surface of the diffraction grating blank in response to said electrical signals; and
    means for scanning the sensing means in a predetermined pattern over the surface of the model diffraction together with said means for replicating.

12. The apparatus as defined by claim 11 wherein means for sensing the groove surface of the holographic model diffraction grating comprises a sensing head of a scanning tunneling microscope.

13. The apparatus as defined by claim 12 and further comprising means for applying a bias voltage between the model grating and the sensing head, to generate quantum mechanical tunneling current which is sensed to obtain a surface profile of individual grooves of the model grating.

14. The apparatus as defined by claim 13 wherein said holographic model comprises an aberration corrected holographic grating model.

15. The apparatus as defined by claim 14 and further comprising a carriage supporting both the model grating and the grating blank.

16. The apparatus as defined by claim 15 and wherein said means for moving includes a pantographic arm connecting the sensing head with the means for replicating.

17. The apparatus as defined by claim 16 wherein said means for moving additionally includes a ruling engine which operates to respectively move said carriage and said pantographic arm along two of three mutually perpendicular axes.

18. The apparatus as defined by claim 17 and additionally including means for moving the sensing means along a third of said three mutual axes in response to the sensed quantum mechanical tunneling current.

19. The apparatus as defined by claim 18 wherein said means for moving the sensing means along said third axis includes a control loop which operates to maintain a tip of the sensing head at a constant height above a predetermined groove of the model grating in response to the sensed quantum mechanical tunneling current.

20. The apparatus as defined by claim 19 wherein said control loop includes a signal processor responsive to the sensed quantum mechanical tunneling current and generating control signals for controlling the movement of the tip of the sensing head along said third axis and additionally the movement of the carriage via the ruling engine along one of said two axes, and wherein the ruling engine controls movement of the pantographic arm and the means for replicating along the other of said two axes.

* * * * *